(12) United States Patent
Bright et al.

(10) Patent No.: US 7,283,257 B2
(45) Date of Patent: Oct. 16, 2007

(54) PRINT JOB GUI

(75) Inventors: Stephen K. Bright, Pittsford, NY (US); Philip J. Sliwa, Webster, NY (US); Kara A. Goldstein, Rochester, NY (US); Jeremy E. Kriegel, Somerville, MA (US); Larry E. Harkins, Rochester, NY (US); Thomas J. Perry, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 966 days.

(21) Appl. No.: 10/621,824

(22) Filed: Jul. 17, 2003

(65) Prior Publication Data

US 2004/0060010 A1    Mar. 25, 2004

Related U.S. Application Data

(60) Provisional application No. 60/413,527, filed on Sep. 25, 2002.

(51) Int. Cl.
*G06F 3/12* (2006.01)
*G06F 3/048* (2006.01)

(52) U.S. Cl. .................. 358/1.1; 715/525; 715/700; 715/777; 358/1.15

(58) Field of Classification Search ............... 715/525, 715/700, 771, 777, 781, 810, 835; 399/81, 399/82; 358/1.1, 1.9, 1.13, 1.15; 345/777, 345/715, 804, 709

See application file for complete search history.

(56) References Cited

U.S. PATENT DOCUMENTS

| | | | |
|---|---|---|---|
| 6,628,311 B1* | 9/2003 | Fang | 715/777 |
| 7,159,190 B2* | 1/2007 | Perry | 715/825 |
| 7,161,691 B2* | 1/2007 | Nakagiri et al. | 358/1.13 |

* cited by examiner

*Primary Examiner*—Alexander Eisen
*Assistant Examiner*—Iriana Cruz
(74) *Attorney, Agent, or Firm*—Joseph M. Young

(57) ABSTRACT

A printing method, including offering a choice to create special pages in a print job; simultaneously displaying a plurality of selectable features, each feature corresponding to a category of special pages; receiving a selection of a first selectable feature; displaying a child window including selectable options of the first selectable feature; receiving a selection of at least one option corresponding to a first range of pages; and displaying a summary view window, wherein the summary window includes the first range of pages and the at least one selected option that the user has selected for the first range of pages.

6 Claims, 10 Drawing Sheets

Stock

Stocks used in Job

| In Tray | ID | Size | Color | Type | Drilled | Name | Weight | Sides Co... | Coating | Uncoate... | Grain |
|---|---|---|---|---|---|---|---|---|---|---|---|
| 🗇 | na.letter | US Letter | White | Standard | Not drilled | Printer D... | Printer ... | Printer D... | ----- | Printer D... | Printer ... |

Stock Library

| In ... | F... | ID | Size | Color | Type | Drilled | Name | Weight | Sides Co... | Coating | Uncoate... | Grain |
|---|---|---|---|---|---|---|---|---|---|---|---|---|
| 🗇 | ☑ | na.letter | US Lette... | White | Standard | Not drilled | Printer D... | Printer... | Printer D... | ----- | Printer D... | Printer... |
| 🗇 | ☑ | na.legal | US Lega... | White | Standard | Not drilled | Printer D... | Printer... | Printer D... | ----- | Printer D... | Printer... |
| | ☑ | ledger | Tabloid (... | White | Standard | Not drilled | Printer D... | Printer... | Printer D... | ----- | Printer D... | Printer... |
| | ☑ | acme1 | ----- | ----- | ----- | ----- | ----- | ----- | ----- | ----- | ----- | ----- |
| | ☑ | joe's | ----- | ----- | ----- | ----- | ----- | ----- | ----- | ----- | ----- | ----- |
| | ☑ | acme2 | ----- | ----- | ----- | ----- | ----- | ----- | ----- | ----- | ----- | ----- |
| | ☑ | cheap | ----- | ----- | ----- | ----- | ----- | ----- | ----- | ----- | ----- | ----- |
| | ☑ | Stock 1 (... | A3 (297... | White | Standard | Not drilled | Printer D... | Printer... | Printer D... | ----- | Printer D... | Printer... |
| | ☑ | Stock 2 (... | ISO B4 (... | White | Standard | Not drilled | Printer D... | Printer... | Uncoated | ----- | Printer D... | Printer... |
| | ☑ | Stock 3 (... | JIS B4 (... | White | Standard | Not drilled | Printer D... | Printer... | One Side | Satin | Printer D... | Printer... |

☐ Use selected stock

[ Properties... ]  [ Add Stock... ]  [ Delete ]  [ Close ]

*FIG. 5*

PRINT JOB GUI

This application is based on a Provisional Patent Application No. 60/413,527, filed Sep. 25, 2002.

The present invention relates generally to user interfaces for document-processing devices, such as copiers, printers, scanners, and the like, and more specifically to a user interface that provides assistance to solve a user's multiple set printing problems.

The continued evolution of office document machines, such as copiers, printers, facsimile machines, and scanners, has resulted in highly sophisticated and function-rich machines. Typical selectable functions, such as for a copier, include making darker or lighter copies, selecting a number of copies, selecting from a number of alternate paper sizes, selecting stapled copies, copying on one or both sides of a paper sheet from one or both sides of an original, and image reduction or enlargement. Substantial efforts have been devoted to the design and layout of such machines to enhance an operator's understanding and reduce the possibility of operator entry errors. In a distributed, network oriented document management system, such as including one or redistributed printers, scanners, facsimile devices, and the like, such complicated functions may be selected via a "window" on a standard personal computer screen. Regardless of the particular interface used to control one or more document machines, there is still a premium to be placed on avoiding operator confusion.

Print jobs sometimes include special pages. Special pages can include covers (front and back), exception pages, chapter starts, and inserts. The user enters special information/instructions so that these pages are produced as desired. In the past these special pages features were included as separate portions of the user interface. Further, user's were not offered a summary of the special pages they had chosen. The legacy GUIs for these "Special Page" features has treated each of these features (Covers, Exception Pages, Page Inserts and Chapter Starts) as separate GUI functions. This GUI design can make the user's mental load so high that these features become unusable. The user may find it difficult to understand the relationship between what the user has programmed and what is printed.

Embodiments include a printing method, including offering a choice to create special pages in a print job; simultaneously displaying a plurality of selectable features, each feature corresponding to a category of special pages; receiving a selection of a first selectable feature; displaying a child window including selectable options of the first selectable feature; receiving a selection of at least one option corresponding to a first range of pages; and displaying a summary view window, wherein the summary window includes the first range of pages and the at least one selected option that the user has selected for the first range of pages.

The embodiments will be described in detail herein with reference to the following figures in which like reference numerals denote like elements and wherein:

FIG. 5 illustrates an exemplary embodiment of a stock selection window;

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

Figure 1:
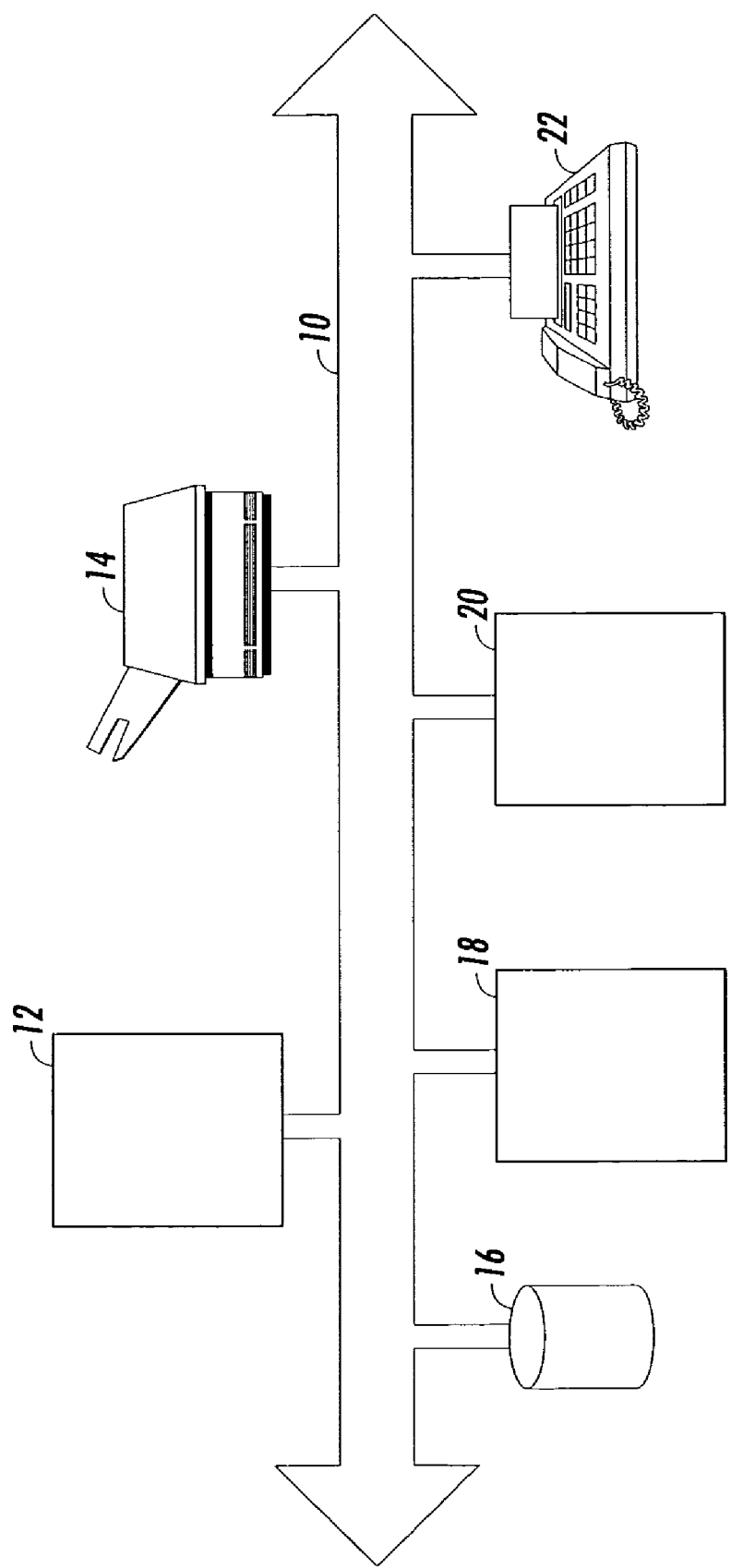
FIG. 1 is simplified diagram showing a networked document services system in which the present invention is useful.

FIG. 1 is a simplified diagram showing an example of a networked document-services system in which the present invention is useful. A network bus 10, which may be of any type known in the art, such as Ethernet or Token-Ring, interconnects a number of computers and peripherals. For example, on network 10 there would be typically any number of personal or mainframe computers 12, scanners 14, shared memories 16, and of course printing devices 18, 20. A printing device can be a copier, printer, digital copier, etc. The network 10 may further interconnect a fax machine 22, which in turn connects with a standard telephone network. What is important is that the various computers and peripherals can interact to perform various document services.

In embodiments, a print driver is associated with a printing device such as 18 or 20, or a special printing application having its own set of printing tools is associated with a computer such as 12. The print driver or application will have a graphical user interface (GUI) associated with it. Throughout the description, I will refer to "a GUI" or "a method." The GUI and method can be used with a print driver or with other software associated with a printing device, such as, for example, print submission software. Such software is often used by entities such as, for example, print shops.

Figure 2:
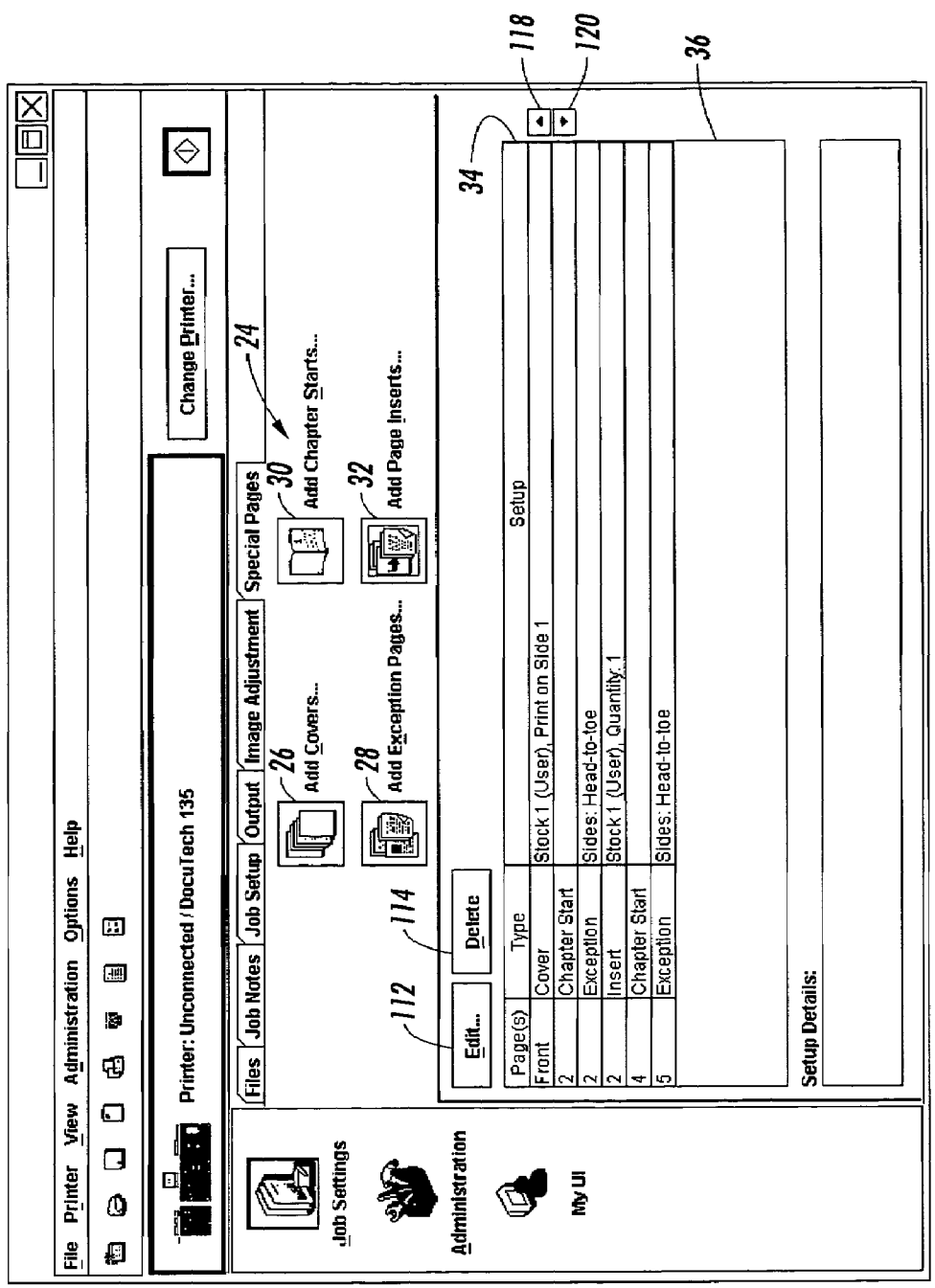
FIG. 2 illustrates an exemplary embodiment of the present invention.

FIG. 2 is an example of an embodiment of an application interface. The application interface shown in FIG. 2 is used for printing documents. The application interface includes multiple tabs related to particular elements of the print job. Among other tabs, the application interface includes a "special pages" tab 24. Special pages include a number of specific page types that a user may select that will be different from the main pages of a document. Special Pages include, but should not be limited to Covers, Page Inserts, Chapter Starts, or Exception Pages. A Special Pages tab would include at least two special page features. In embodiments, it would include all the features listed here. However, it could include more or less features. More features listed in one location offer the user more convenience.

When a user selects the special pages tab 24, the user is presented with an array of features for special rendering of pages. These features can include, for example, a feature 26 for selecting covers, a feature 28 for adding exception pages, a feature for adding chapter starts 30, and a feature 32 for adding page inserts. The special pages tab 24 also includes a summary view table 34 for viewing selected special pages. Additionally, a special page setup details 36 is included at the bottom of the screen. This summary view displays a summary of the programming for the special pages that have already been set up.

Each of the selectable features 26, 28, 30, and 32 on the special pages tab has previously been treated as separate GUI functions. Combining these features on one page along with a summary window and a child window listing the special pages is more convenient for, and less taxing on, the user.

Figure 3:
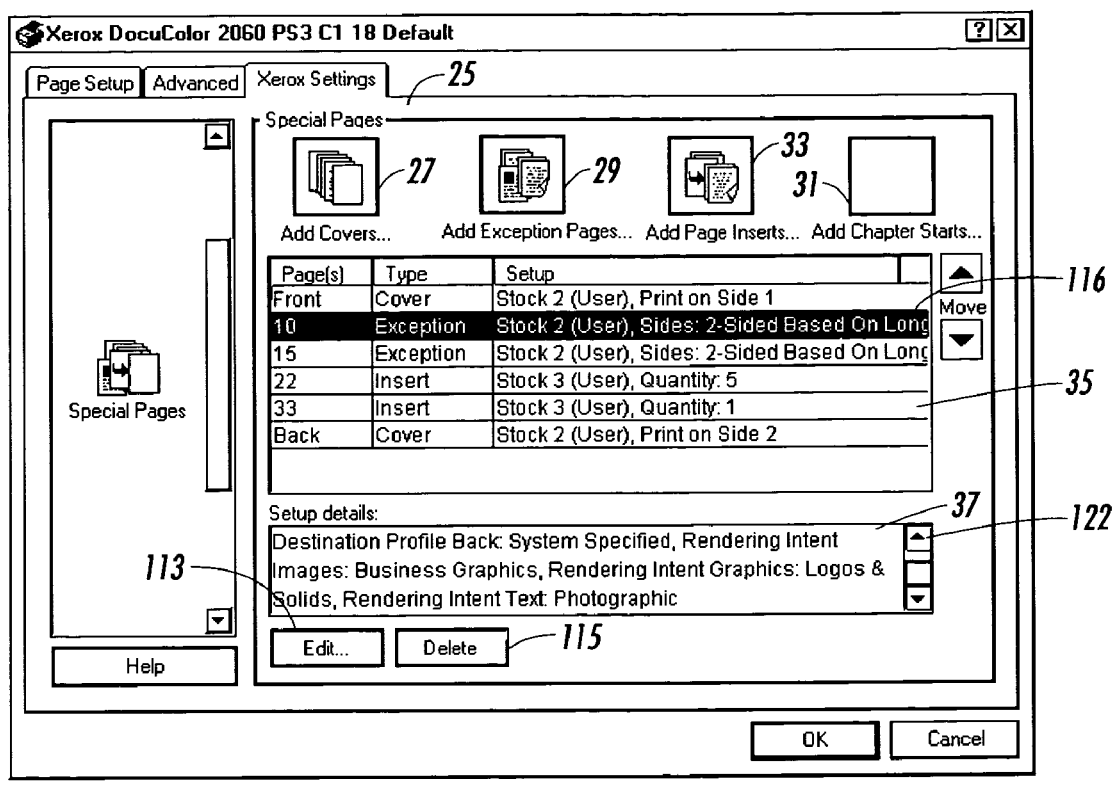
FIG. 3 illustrates another exemplary embodiment of the present invention.

FIG. 3 shows another embodiment of a special pages screen 25. In this case, it is part of a print driver. The tab is labeled "Xerox Settings" in FIG. 3. Obviously, the precise name of the page or tab does not matter. The print driver special pages UI contains the same features as the special pages UI for a specialized application, including, for example, a cover selection feature 27, an exception page feature 29, a chapter starts feature 31, and a page inserts feature 33. The special pages interface 25 also includes a summary view table 35 for viewing selected special pages. Additionally, a special page setup details 37 is included at the bottom of the screen.

Figure 4:
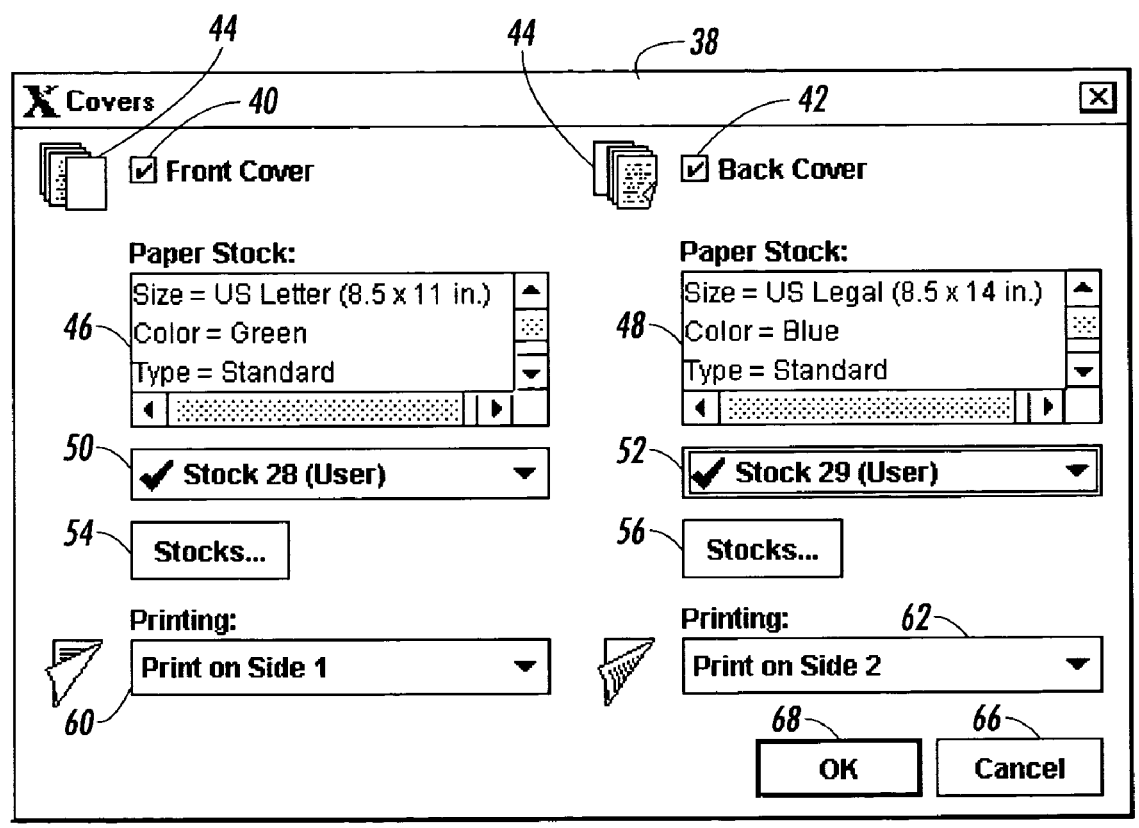
FIG. 4 illustrates an exemplary embodiment of a covers feature window.

Referring to FIG. 2, if the user were to select the feature 26 labeled covers, he would be presented with a covers feature child window 38 such as that shown in FIG. 4. In embodiments, the cover feature window 38 has a portion devoted to the front cover and a portion devoted to the rear cover. The front and back covers can be the same or different. In embodiments, the window 38 includes a "Front Cover" check box 40 for enabling a front cover and a "Back Cover" check box 42 for enabling a back cover. In embodiments, a graphic illustration 44 of the appropriate cover may appear near each checkbox. Windows 46, 48 below each cover allow the user to view the size, color and type of each cover selected in features 50, 52. Additional stock characteristics as shown in 58 could also be displayed in windows 46, 48.

First and second features 50, 52, located beneath the front and rear covers, are drop-down list selectors. Each feature 50, 52 can be used to select a pre-defined stock and is labeled with the particular stock to be used for its corresponding cover. For example, the stocks being used in FIG. 4 are user-defined stocks 28 and 29. The user can select the features labeled "stocks" 54, 56 to get more detailed descriptions of individual stocks. In embodiments, when the user selects one of the features labeled "stocks", the user will be presented with a new window 58, referred to as a stock selection box as shown in FIG. 5. In embodiments, the stock selection box 58 contains a list of stocks (referred to in FIG. 5 as a "Stock Library") from which a user may choose. The user has the option of choosing one of the previously defined stocks or of creating a new one, by the "Add Stock" feature.

Returning to FIG. 4, the printing tabs 60, 62 allow the user to select which side(s) of the covers should receive print. Covers can be blank, or can be printed on one or both sides. The printing features 60, 62 allow the user to select the side(s) of each cover on which images will be printed. The user can select print on side 1, print on side 2, or print on both sides.

Covers can be a different size, type or color from the paper stock used for the job pages. The front and back cover may also have differing printing options between them, and each may use different paper stock. For covers to be applied to a signature job (wherein the front cover and rear cover are printed on the same sheet, which is then folded), the stock for the front cover and the back cover must be the same. When both a front cover and a back cover are selected and the stock selection is not the same for both, when the user OKs the dialog, a conflict message is raised to the user. The conflict message instructs the user that in order to set up signature jobs, the stock for both the front cover and the back cover need to be the same.

When the user is finished, the user may select the Cancel Feature 66 to dismiss the window and make no changes, or the OK Feature 68 to dismiss the window and save and display the changes into the summary view table 34.

Figure 6:
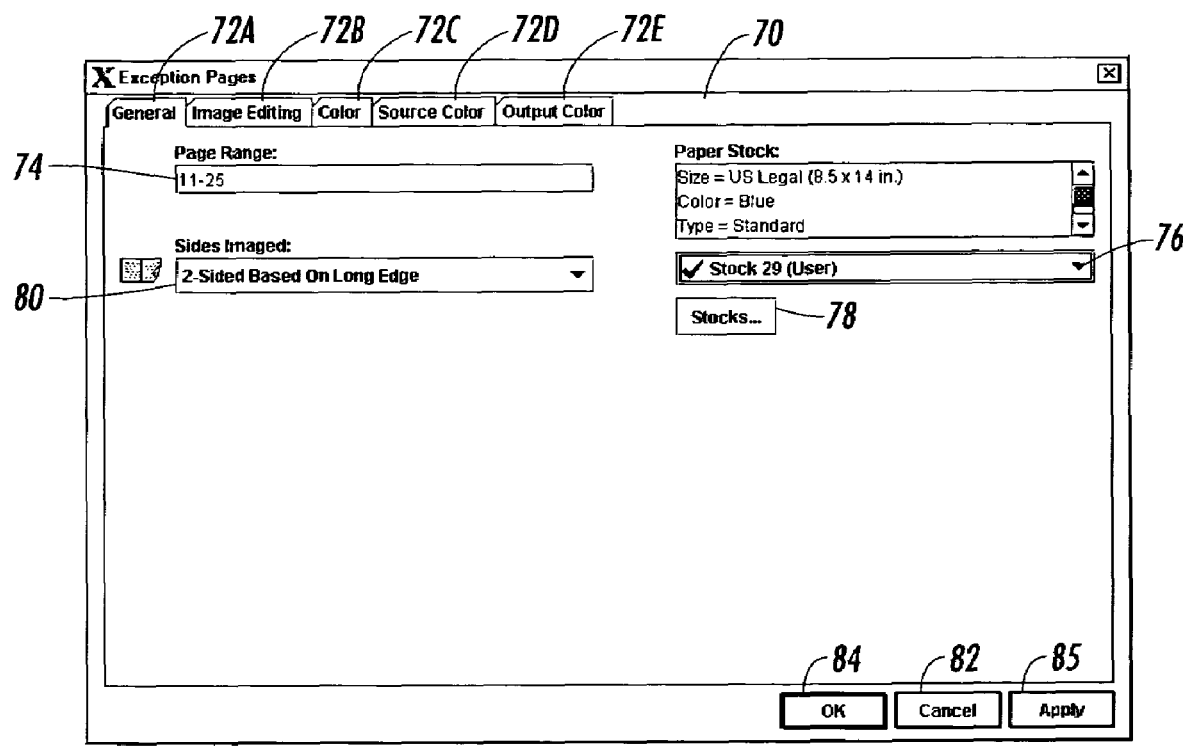
FIG. 6 illustrates an exemplary embodiment of an exception pages window.

Returning to FIG. 2, the user may also select the exception pages feature is 28. When the exception pages feature 28 is selected, the user is presented with an exception pages child window 70, such as that disclosed in FIG. 6.

In the exception pages window 70, the user may select from a variety of options. The exact options available to the user vary based upon the printer being used. Multiple tabs 72A-E along the top of the exception pages window identify categories of changes that may be made to a group of exception pages. In embodiments, the tabs include categories such as General, Image Editing, Color, Source Color, and Output Color.

In embodiments, the general tab screen contains a page range field 74 wherein the user enters a list of pages to specify a page or range of pages contained in the document that will be setup differently from the rest of the document. The field 74 is labeled "Page Range:", although it could have any title. The user can enter page numbers and/or page ranges separated by commas, such as, for example, 1, 3, and 5-12. In this example page 1, page 3 and pages 5 through 12 would be setup as exception pages. A page range can be limited to a single page.

Another feature 76 that is part of the general tab of the exception pages window is labeled with the particular stock to be used for each exception page. When the user selects the feature labeled "stocks" 78, the user will be presented the stock selection box 58 of FIG. 5. A "sides imaged" feature 80 lists whether one or both sides of the exception pages are going to be imaged and whether they will be imaged along the long edge or the short edge of the exception pages.

In embodiments, the window dialogs for the other tabs, Image Editing, Color, etc., for Exception Pages are the same as the ones at the job level. When a user selects those particular tabs, the same selection screens are displayed as would be if the user selected them from the main page.

When the user is finished, the user may select the Cancel Feature 82 to dismiss the window and make no changes, or the OK Feature 84 to dismiss the window and save and display the changes into the summary view table 34. The user may also select the Apply Feature 86 to save and display the changes into the summary view table 34 without dismissing the exception pages window 70.

Figure 7:
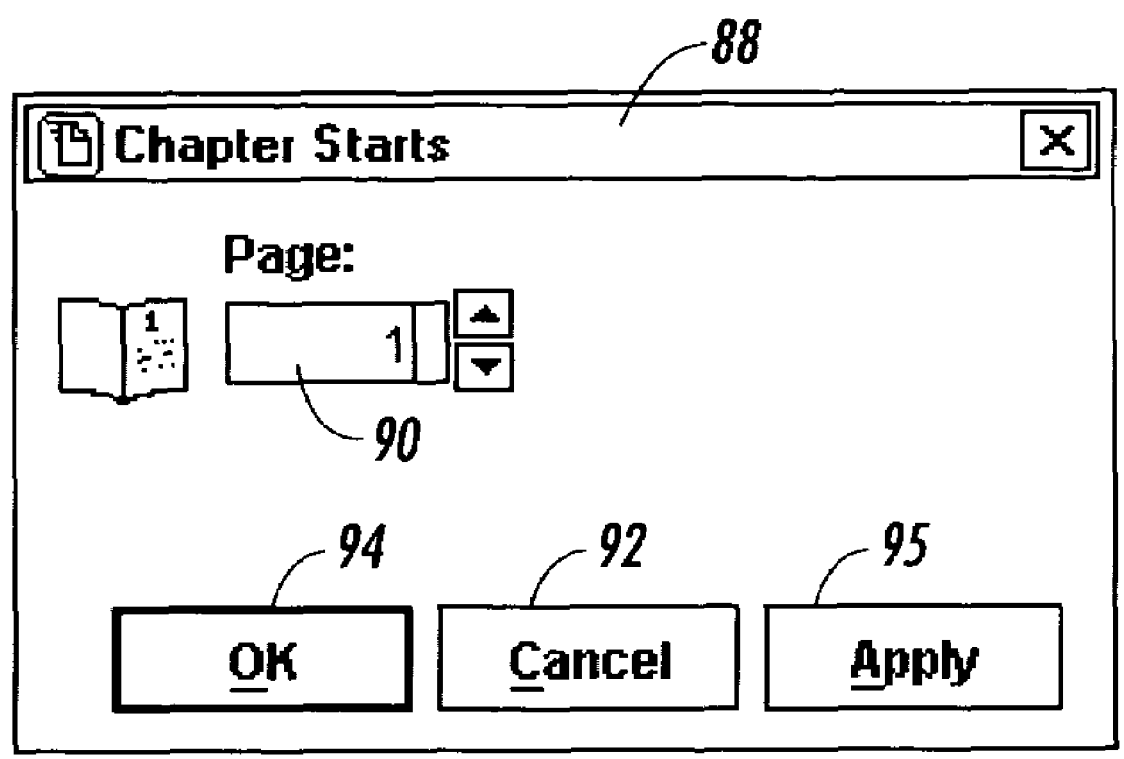
FIG. 7 illustrates an exemplary embodiment of a chapter start window.

In embodiments, a user may also select the chapter start feature 30 from FIG. 2. When the user selects the chapter start feature 30, the user is presented with a chapter start child window 88, such as that disclosed in FIG. 7. In embodiments, the chapter start window contains a field 90 wherein the user identifies a page on which a chapter is to begin. Chapter starts indicate a new chapter and typically are programmed so that they only begin on odd numbered pages. When the user is finished, the user may select the Cancel Feature 92 to dismiss the window and make no changes, or the OK Feature 94 to dismiss the window and save and display the changes into the summary view table 34. The user may also select the Apply Feature 95 to save and display the changes into the summary view table 34 without dismissing the chapter start window 88.

In embodiments, a user may also select the page insert feature 32 from FIG. 2. When the user selects the page insert feature 32, the user is presented with a page insert child window 96, such as that disclosed in FIG. 8. The user selects the page insert option to place sheets, colored stock, or preprinted stock in the output job in a particular position or positions setup by the user.

Figure 8:
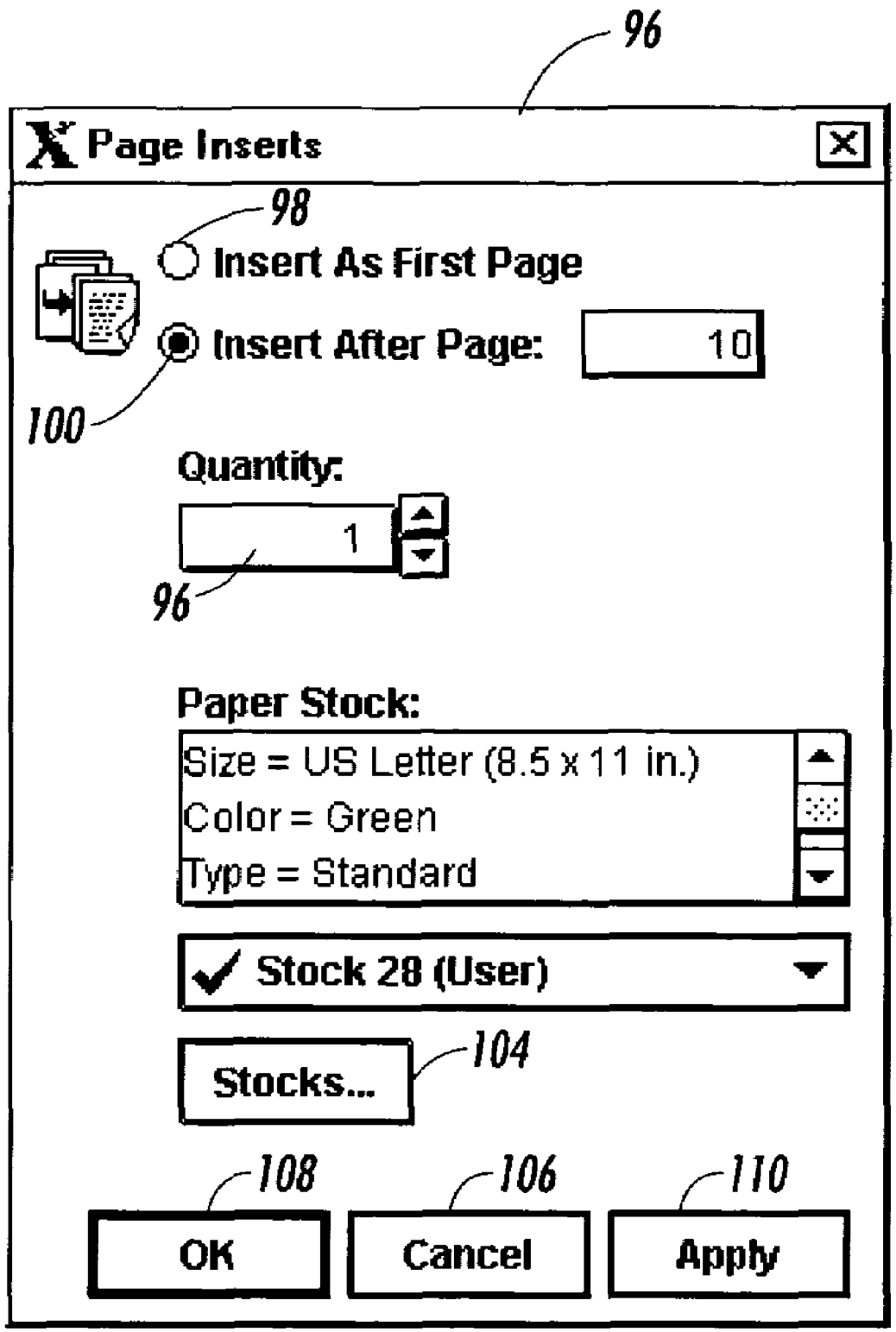
FIG. 8 illustrates an exemplary embodiment of a page insert window.

The page insert window 96 can include one or more features 98, 100 enabling the user to indicate where page inserts should go. Specifically in FIG. 8, the user can select a radio feature 98 corresponding to having a page inserted before the first page of a job or the user can select a radio feature 100 corresponding to have an insert occur after a particular page. These two choices are represented by radio buttons as shown in FIG. 8. In such embodiments, the choices are mutually exclusive and only one may be selected. However, the options do not have to be mutually exclusive. The user could have been offered a checklist of insert locations and allowed to select one or more insert locations. When the user selects the radio feature 100 corresponding to page insertion after a particular page, the user then enters the page into the field, which in embodiments is labeled "Insert After Page." In embodiments, multiple types of inserts may be inserted at the same location between two pages of the document. The insert order would then follow the same order as programmed by the user and the summary view 34 will list the inserts in that order.

The user may also select the number of inserts that may be placed. The user enters the number into another field 102 in the page insert window 96. In embodiments, this field is labeled "Quantity."

The page insert window 96 also contains a paper stock field, which list the features of the insert(s) to be added. The stock bar lists all the stocks the user has setup and allows the user to select the desired stock. The feature labeled "stocks" 104 may be selected by the user to display a stock window, such as window 58 in FIG. 5, where detailed information about available stocks is shown.

When the user is finished, the user may select the Cancel Feature 106 to dismiss the window and make no changes, or the OK Feature 108 to dismiss the window and save and display the changes into the summary view table 34. The user may also select the Apply Feature 110 to save and display the changes into the summary view table 34 without dismissing the page insert window 96.

The embodiments shown in FIGS. 4 through 5 are exemplary. The features disclosed with respect to FIGS. 4 and 5 are not all encompassing, nor are they all required. The customizable features of the covers, page inserts, chapter starts, or exception pages may be greater or lesser than those disclosed.

The summary view table 34 under the special pages tab 24 in FIG. 2 and summary view table 35 under Xerox settings tab 25 in FIG. 3 display all of the special pages selected by the user. In embodiments, the summary tables 34, 35 list the selected pages in order of page numbers. In case of duplicate items for same page, the features typically show up in a preselected order. That can be the order of the alterations or some other method such as the front cover, exceptions, chapter starts, inserts, and the back cover. Information in the summary window is just that, a summary. Detailed descriptions for a particular page or page range are shown in the setup details fields 36, 37. In embodiments, a scroll control (not illustrated) is made available when the data exceeds the table height.

In embodiments, user selectable edit 112, 113 and delete 114, 115 features are included. For example, referring to FIG. 3, a user first highlights the row of a particular special page, such as the row 116 corresponding to page 10 in the summary view table 35. In embodiments, inverting the display for the table row(s) highlights the selected item(s) in the table. In embodiments, the rows can be selected by the keypad (such as by holding down the ctrl key and using the up or down arrows on the keyboard) or by mouse. In embodiments, the edit features 112, 113 are labeled Edit and the delete features 114, 115 are labeled Delete, though they could be labeled with any similar meaning. In embodiments, the features can be made available only if an item has been selected/highlighted in the table.

Selecting edit opens the particular special page child window associated with the highlighted page. In embodiments, double clicking the particular row will also open the child window associated with the highlighted page. The user may then alter the details for that particular page. In embodiments, the actual page ranges are not editable when the edit feature is selected. To edit the page range, a user needs to select the particular special page feature to call up the child window and make changes. The user may also select multiple rows to edit. When more than one row of similar items is selected, and there are different values setup for the same option, the resulting special page child window shall display a default option, such as, for example, "No Change (Current Value)" value as the option choice. If the user changes this default option to some other value, then all values for this option shall be set to the new value.

Selecting delete removes the selected item(s) from the table. In embodiments, the user will be presented with a message stating that the setup for the selected pages will be deleted. The message will also ask the if the user is sure he wants to delete the selected item. The user will be presented with yes or no features with which to make a choice.

The promote 118 and demote 120 page insert features can be used to move items within the summary view. As most selected alterations are tied to different pages, moving them does not make a difference. However, in some cases, the user may want to change the order of page inserts at a particular point in the document. In embodiments, each different page insert shall have its own row in the table. For example, referring to FIG. 2 if you added four different inserts of varying types in one location, and you wanted the last one you added to come first, you could select the three other inserts and press the demote feature 120 or select the last insert and press the promote feature 118 three times to get the desired state. In embodiments, the promote/demote features shall be available only when page insert item(s) have been selected in the table and can be logically moved.

The foregoing description has discussed selecting features "corresponding" to particular ranges of pages. The phrase "corresponding to a particular range of pages" refers to either the page range itself or the location of the page(s) being inserted. With respect to chapter starts and exception pages, the features and selected subfeatures or options on the corresponding child windows alter the formatting, stock, and other elements of the page itself. With respect to covers and page inserts, the features and options are usually additional pages added to a print job. The cover pages are usually not paginated and start and finish the print job. The location of the page inserts is identified with respect to a particular page or range of pages.

The setup details field 36, 37 displays a complete stock description and other setup information. In embodiments, the field will be only a few, for example three, lines in height and will extend the length of the table. A scroll control 122 can be made available when the data exceeds the field height. The setup details window 37 displays the detailed information corresponding to the page or page range selected in the summary view table 35. In embodiments, the descriptions in the setup details view 37 shall be displayed when one item and only one item is selected in the special pages summary view 35. In other words, when nothing is selected or if more that one item is selected, the setup details view 37 shall be blank.

Figure 9:
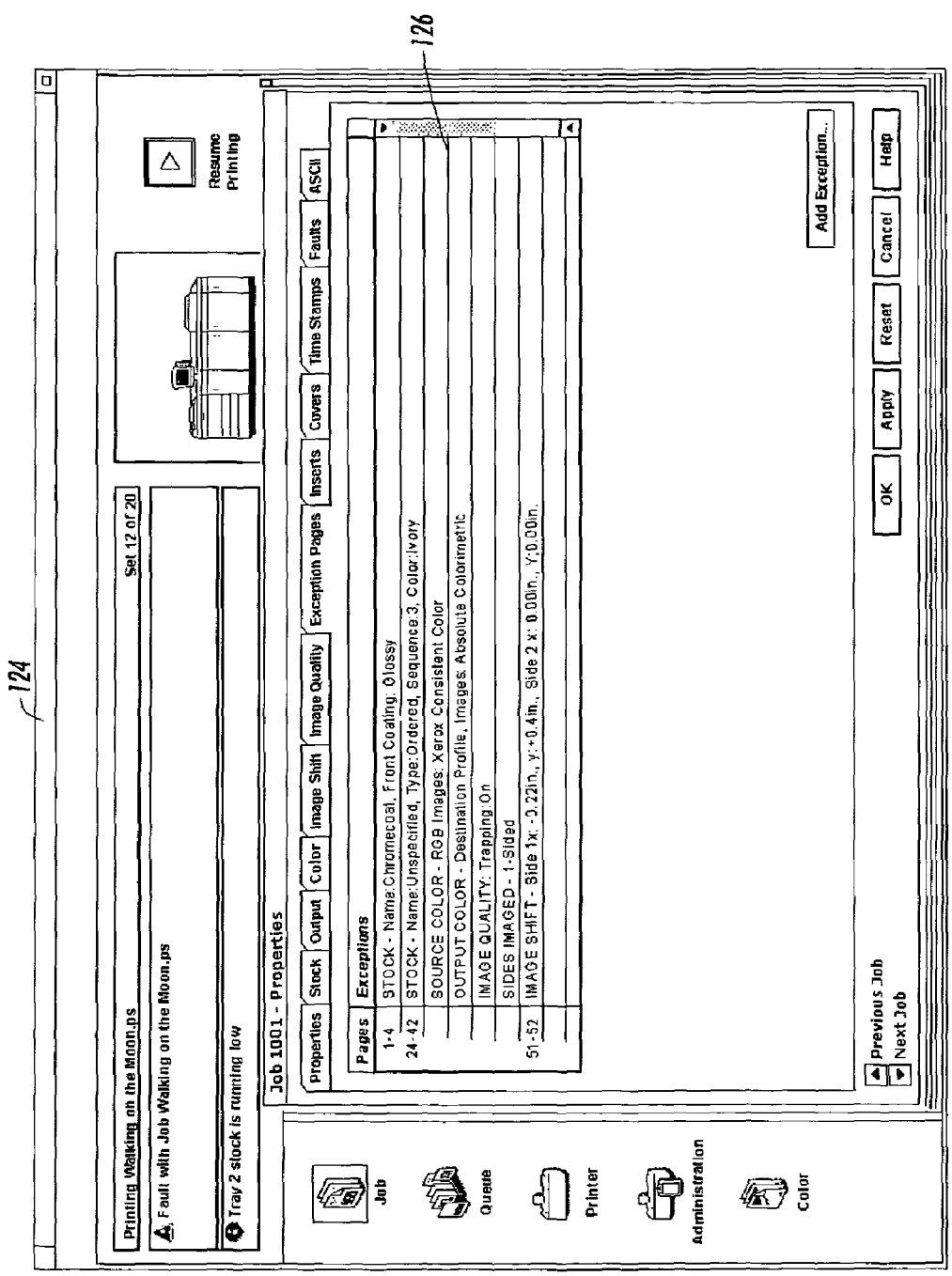
FIG. 9 illustrates another embodiment of the present invention.

FIG. 9 illustrates yet another embodiment 124 of a printing method GUI. In embodiments, instead of a special tab in the print GUI, the special features are simply included as more tabbed pages on a basic print submission or print driver interface. Each tabbed page would have the same or similar features corresponding to the special page windows discussed with respect to FIGS. 4-8. In the example 124 shown in FIG. 9, the printing GUI includes tabs associated with properties, stock, output, color, image shift, image quality, inserts, covers, time stamps, faults, and ASCII. It is not required that every one of these features be present for the invention described herein. The tab labeled "Exception Pages" would contain a summary view window 126. This summary view would list only the attributes that differ from job level settings. Further, to eliminate the need for horizontal scrolling in the summary view window, each category of attribute for a particular page or page range appears in a separate row. While not illustrated here, the printing method GUI 124 could also contain a setup details window.

Figure 10:
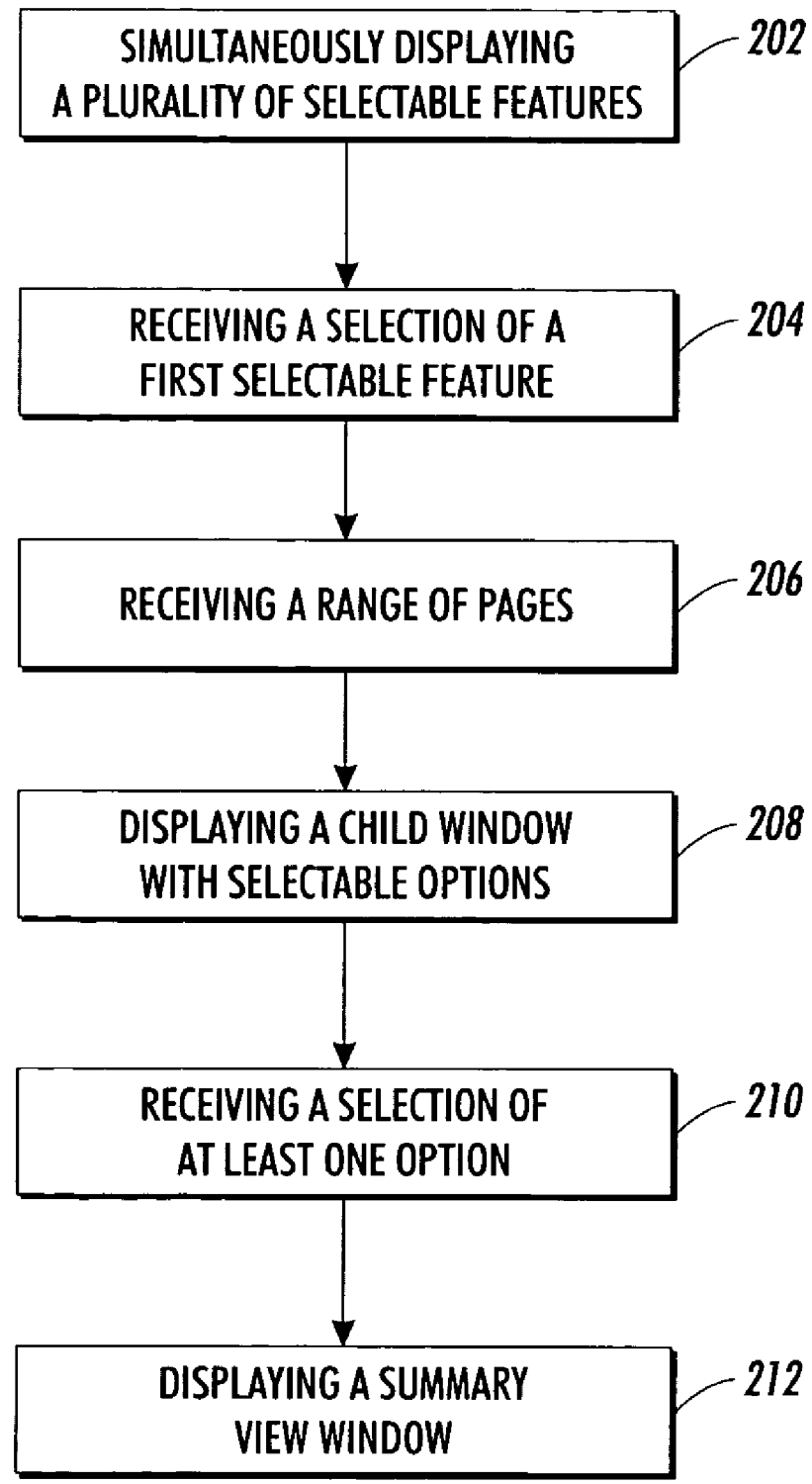
FIG. 10 is a flowchart of an embodiment of a printing method.

FIG. 10 illustrates a flow chart summarizing the printing method described herein. First, the GUI displays a plurality of selectable features to the user 202. The user selects a feature, which is received by the GUI 204. The user may also select a range of pages that are displayed on the Special Pages tab 206. However, this step is not required. In either case, the GUI then displays a child window with selectable options to the user 208. For certain features, the child window may also offer to and receive from the user a page range selection. Therefore, the receipt of a page range selection 206 can occur before step 204 or after step 208. The GUI then receives at least one feature selection from the user 210. After the user enters a selection, the summary view window is displayed again 212.

While the present invention has been described concerning specific embodiments thereof, it will be understood that it is not intended to limit the invention to these embodiments. It is intended to encompass alternatives, modifications, and equivalents, including substantial equivalents, similar equivalents, and the like as may be included within the spirit and scope of the invention as defined by the appended claims.

What is claimed:

1. A printing GUI, comprising:
   a plurality of tabbed pages, wherein each page corresponds to a special page type of a print job, including
   a first tabbed page includes a first set of selectable options relating to a first special page feature and
   a second tabbed page includes a second set of selectable options relating to a second special page feature, and
   a third tabbed page includes a summary view window for displaying a summary of the first set of selected options and the second set of selected options.

2. The printing GUI of claim 1, wherein the first special page feature includes at least one of covers, exception pages, chapter starts, and page inserts.

3. The printing GUI of claim 1, wherein the second special page feature includes at least one of covers, exception pages, chapter starts, and page inserts.

4. The printing GUI of claim 1, wherein the plurality of tabbed pages includes at least five tabbed pages.

5. The printing GUI of claim 1, wherein the printing GUI is part of a device GUI.

6. The printing GUI of claim 1, wherein the printing GUI is a part of a print driver.

* * * * *